United States Patent
Grasset

(10) Patent No.: US 8,723,744 B2
(45) Date of Patent: May 13, 2014

(54) METHOD FOR MAKING CONTACTLESS PORTABLE DEVICES WITH DIELECTRIC BRIDGE AND PORTABLE DEVICES

(75) Inventor: Yannick Grasset, Vallauris (FR)

(73) Assignee: RFIDEAL, Vallauris (FR)

( * ) Notice: Subject to any disclaimer, the term of this patent is extended or adjusted under 35 U.S.C. 154(b) by 219 days.

(21) Appl. No.: 13/130,938

(22) PCT Filed: Nov. 24, 2009

(86) PCT No.: PCT/FR2009/001340
§ 371 (c)(1),
(2), (4) Date: Jun. 15, 2011

(87) PCT Pub. No.: WO2010/058109
PCT Pub. Date: May 27, 2010

(65) Prior Publication Data
US 2011/0242779 A1 Oct. 6, 2011

(30) Foreign Application Priority Data
Nov. 24, 2008 (FR) .................................. 08 06592

(51) Int. Cl.
*H01Q 11/12* (2006.01)
*H01Q 21/00* (2006.01)
*H01L 29/80* (2006.01)
*H01L 31/112* (2006.01)

(52) U.S. Cl.
USPC .................... 343/742; 343/867; 343/700 MS; 257/679; 257/922; 257/276

(58) Field of Classification Search
USPC ................ 343/700 MS, 742, 867; 340/572.1, 340/572.7, 572.8; 29/832, 833; 257/679, 257/922, 276
See application file for complete search history.

(56) References Cited

U.S. PATENT DOCUMENTS

| | | | | |
|---|---|---|---|---|
| 4,980,971 A * | 1/1991 | Bartschat et al. | ................ | 29/833 |
| 6,549,176 B2 * | 4/2003 | Hausladen | ................... | 343/895 |
| 6,617,676 B1 * | 9/2003 | Oddou et al. | ................ | 257/679 |
| 6,939,429 B2 * | 9/2005 | Takemura | .................... | 156/302 |
| 6,973,716 B2 * | 12/2005 | Chung et al. | .................... | 29/832 |
| 7,224,280 B2 * | 5/2007 | Ferguson et al. | .......... | 340/572.7 |

FOREIGN PATENT DOCUMENTS

WO 98/48378 A2 10/1998
WO 2009/043511 A1 4/2009

OTHER PUBLICATIONS

International Search Report of PCT/FR2009/001340, date of mailing May 31, 2010.

* cited by examiner

*Primary Examiner* — Hoang V Nguyen
(74) *Attorney, Agent, or Firm* — Westerman, Hattori, Daniels & Adrian, LLP

(57) ABSTRACT

The invention relates to a method for manufacturing contactless portable objects having an integrated circuit, and to contactless portable objects having an integrated circuit. The method of the invention is characterized in that it comprises the following steps: providing a dielectric antenna substrate (6) which carries an antenna circuit (7) having at least one turn (7-1, 7-2, 7-3, 7-4) and two contact terminals (8-1, 8-2); providing a bridge (5) having a dielectric bridge substrate (1) and a chip (3) having an integrated circuit; and placing said bridge (5) with said chip (3) onto said dielectric antenna substrate (6) so that the bridge (5) straddles said at least one turn (7-1, 7-2, 7-3, 7-4) and forms an electric connection between said chip (3) and said antenna circuit (7). The invention is particularly useful for HF RFID objects.

22 Claims, 4 Drawing Sheets

METHOD FOR MAKING CONTACTLESS PORTABLE DEVICES WITH DIELECTRIC BRIDGE AND PORTABLE DEVICES

The present invention relates to a method for manufacturing contactless portable objects having an integrated circuit, and contactless portable objects comprising such an integrated circuit.

The contactless portable objects according to the present invention are objects having a card format, referred to as smart cards, with a contactless operation mode, or objects of various formats which, in particular, are designed for radiofrequency identification (RFID). In this case, these objects of various formats are commonly referred to as electronic tags or inlay objects. In certain applications, contactless objects are designed to be incorporated into portable telephones. These are, in particular, near field communication modules.

More specifically, the contactless portable objects according to the present invention are objects which have a high operating frequency (HF), in particular 13.56 MHz.

The prior art contactless portable objects comprise an integrated circuit and a conducting antenna circuit or antenna circuit. The antenna circuit is produced, for example, by being printed onto an insulating substrate such as paper, cardboard, PET (polyethylene terephathalate), or PVC (polyvinyl chloride). For a high frequency data transmission mode, this circuit is in the form of a spiral, which comprises a plurality of loops or turns. In order to connect the integrated circuit to the outer and inner ends of this spiral, a dielectric layer may be placed onto the conducting antenna circuit. This dielectric layer supports a conducting element for electrical connection between the ends of the spiral and the integrated circuit. The dielectric layer and the conducting element form a bridge.

The complete manufacture of the prior art contactless objects requires the implementation of four fundamental steps. First, the antenna circuit is formed, with the imprint, that is, the terminals of said antenna circuit to which the integrated circuits will be connected. Further, a dielectric bridge substrate is positioned so as to straddle the turns of the antenna circuit. Then, the circuit of said bridge is formed the connection between the inner and outer ends of the antenna circuit and the integrated circuit. Lastly, the integrated circuit is placed, not on the bridge, but at the location of the antenna circuit terminals.

The connection of the integrated circuit's contact pads to the antenna circuit terminals may be performed according to a connection method involving protrusions (or bumps). In this case, a ball, generally made of gold, is deposited on the integrated circuit's contact pads. It is then flipped over ("flip-chip" bonding) for connection to said terminals.

The above-described process has the drawback, in particular, of reducing the throughput of the production machines because of the very small density of integrated circuits placed onto the substrate accommodating the antenna conductor. As a result of this small density, there is a need for frequent and large displacements between the manipulator arm which picks up the integrated circuits, and the substrate onto which these integrated circuits are connected.

Thus, for the production of inlays or tags with conventional formats in cards which meet ISO standards, the distance between the integrated circuits is approximately 8.5 cm and 5.3 cm, along the two axes of the plane. This results in a maximum placement of 220 integrated circuits per square meter. In order to position these 220 integrated circuits, the relative displacement of the manipulator arm(s), with respect to the substrate in which said integrated circuits are accommodated, would be of the order of 11 to 18 meters, without taking into account the displacement required to pick the integrated circuits up from the integrated circuit wafer. The average displacement between two consecutively positioned integrated circuits is thus of the order of 5.3 to 8.5 centimeters. This large distance strongly reduces the throughput of the production machines, and therefore the production throughput of the contactless objects.

Also, U.S. Pat. No. 6,665,193 B1 discloses portable objects in which the electrical connection between the antenna terminals and the chip is formed by means of a bridge carrying the chip. However, to manufacture the objects those disclosed in this document, the placement of an insulator, denoted 240 in FIGS. 5 and 6, is required. In the embodiment of FIG. 5, this insulator does not ensure adequate protection of the chip, which is still directly affected by the mechanical stresses to which the object is subjected. In the embodiment of FIG. 6, although the chip is protected from such mechanical stresses, it is nevertheless positioned so as to face the antenna turns. As a result, the object is not adequately protected against short-circuits between the chip and said turns.

According to the above, a technical problem to be solved by the present invention is to provide a method for the manufacture of portable contactless integrated circuit objects, which overcomes the above-mentioned prior art drawbacks while remaining compatible with all of the antenna implementations and integrated circuits used.

A first object of the present invention to solve this problem is to provide a method for manufacturing contactless portable objects having an integrated circuit, which comprises the following steps:

providing a dielectric antenna substrate which carries an antenna circuit and has at least one and two contact terminals, wherein a first contact terminal is interior to the antenna circuit, and a second contact terminal is exterior to said antenna circuit;

providing a bridge which comprises a dielectric bridge substrate, a chip having an integrated circuit and a circuit for connecting said chip to the antenna circuit; and placing said bridge provided with said chip onto said dielectric antenna substrate, so that the bridge forms an electrical connection between said chip and said antenna circuit, and the chip is positioned, whilst being protected between the bridge substrate and the antenna substrate, or being incorporated within said antenna substrate, at a position offset with respect to the antenna turns.

A second object of the present invention is to provide a contactless portable object having an integrated circuit, which comprises:

a dielectric antenna substrate provided with an antenna circuit having at least one turn and two contact terminals; and a bridge placed onto said dielectric antenna substrate, wherein said bridge comprises a dielectric bridge substrate and a chip having an integrated circuit, wherein said bridge forms an electrical connection between said chip and said antenna circuit, the chip being positioned, while being protected between the bridge substrate and the antenna substrate or being incorporated within said antenna substrate, at a position offset with respect to the antenna turns.

Advantageously, —the bridge further comprises a connection circuit and the electrical connection between said chip and said antenna circuit, is formed by said connection circuit; —the bridge further comprises an insulating film, said insulating film at least partially covering the connection circuit; —the bridge is placed onto the antenna substrate so that the chip of said bridge is located between the dielectric bridge substrate and said antenna substrate; —the chip is placed onto the bridge substrate by means of manipulator arms of pick-and-place machines whose displacements are restricted by the size of said substrate; the bridge further comprises a connection circuit and the electrical connection between said chip and said antenna circuit is formed by said connection circuit; and—the object is an HF RFID object.

The present invention will be better understood from the following non-limiting description with reference to the appended drawings, in which.

Figure 7:
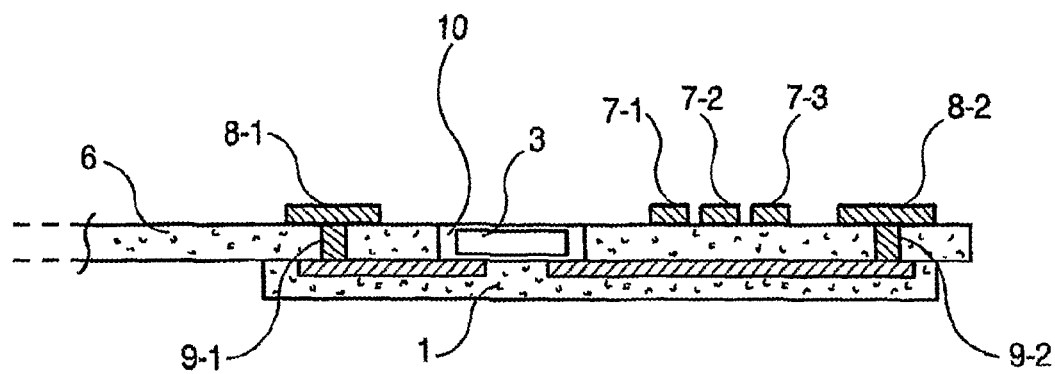
Figure 8:
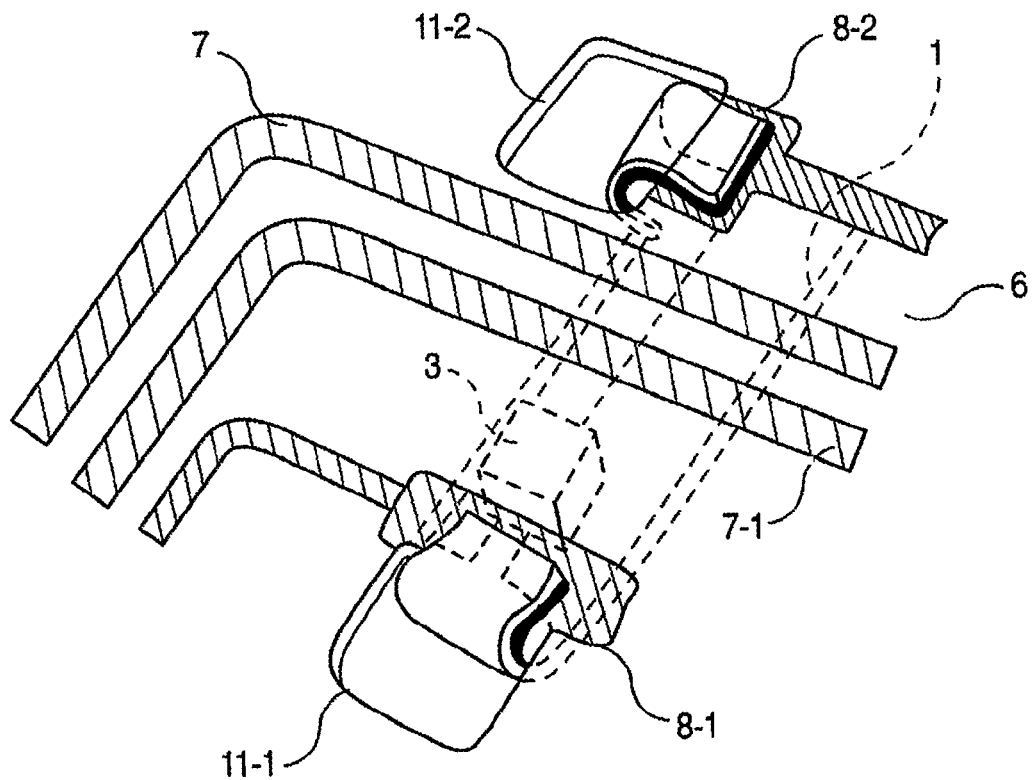
Figure 9:
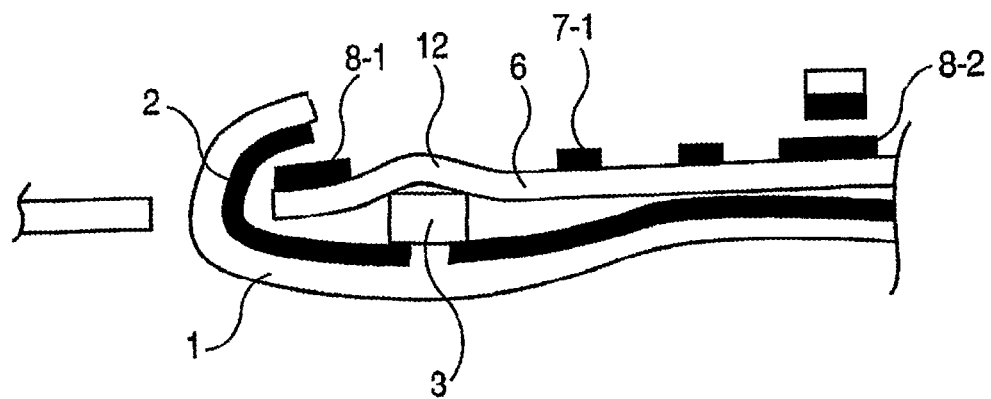

FIG. 7 shows, in a cross-sectional view, an embodiment of a portable object according to the present invention, wherein the bridge is positioned on the rear side of the substrate, the chip being protected by the bridge's dielectric substrate and being positioned in a hole formed in the antenna dielectric substrate, and in which the connection from the bridge to the antenna is implemented within holes formed in the antenna substrate;

FIG. 8 illustrates, in a perspective view, an embodiment of the portable object according to the present invention, wherein the bridge is positioned on the rear side of the substrate and the connection is achieved by means of folds in the bridge, which enter holes formed in the antenna substrate; and FIG. 9 illustrates a detailed cross-sectional view of the embodiment of FIG. 8.

The contactless portable objects according to the present invention are standardized objects of any format. For example, these may have a card format or more restricted formats, and may then be used as RFID tags. In some cases, the format of the contactless objects according to the present invention is larger than that of a card. This is the case, for example, of so-called electronic wallets. The RFID objects that are more specifically targeted by the present invention are RFID objects meeting the ISO-14443 or ISO-15693 standards. Such objects have, in particular, for contactless transmission and reception of data, an operating frequency of 13.56 MHz.

For the manufacture of contactless portable objects according to the present invention, the following steps are performed.

In a first step, a bridge is provided.

Figure 1:
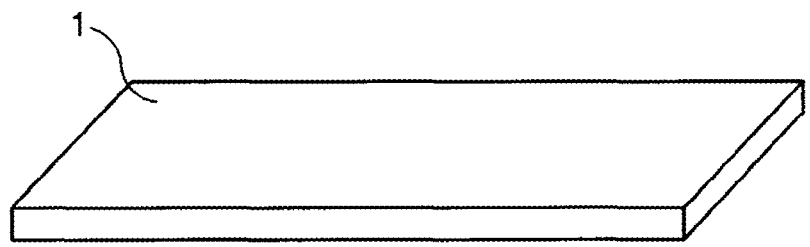
FIG. 1 shows, in a perspective and schematic view, a dielectric substrate for the bridge of a contactless object according to the present invention.

As shown in FIG. 1, such a bridge comprises a dielectric substrate 1. The size of this substrate 1 is much smaller than the size of the portable object. In an example, the substrate 1 is rectangular, from 7 to 30 mm in length and from 5 to 15 mm in width, and has a thickness in the range between 20 and 80 µm. It is made of plastics, in particular PVC, PET or polyimide, or also of any other material such as paper or cardboard, potentially capable of having dielectric properties.

Figure 2:
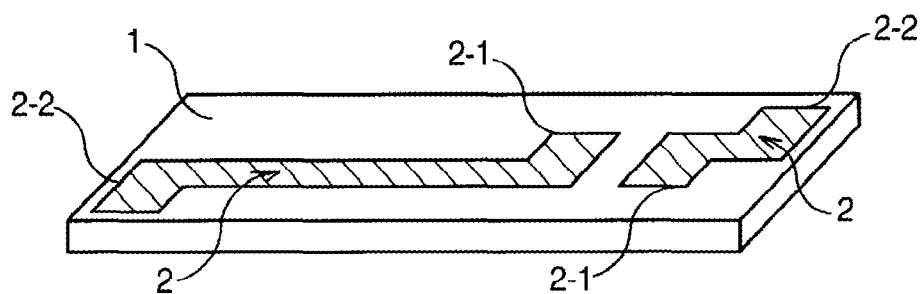
FIG. 2 shows, in a perspective and schematic view, such a substrate carrying a connection circuit.

As shown in FIG. 2, the bridge further comprises a connection circuit 2. This connection circuit is carried by the bridge substrate 1. For example, it is printed onto the surface of said substrate 1, for example by flexography or inkjet printing or according to other material deposition methods for forming a conducting element. The connection circuit 2 has two terminals for connection to the integrated circuit chip in the contactless object. These terminals are denoted 2-1. It further comprises two pads 2-2 for connection to the antenna circuit. These pads 2-2 are located near to the outer edges of the substrate 1. Finally, the connection circuit 2 comprises two circuit elements, with each circuit element being terminated by a connection terminal 2-1 and a connection pad 2-2. It should be noted that, advantageously, the connection terminals are not centered on the bridge substrate 1. These are offset towards one end of said substrate 1, in order to position the chip in an offset position on the bridge substrate.

Figure 3:
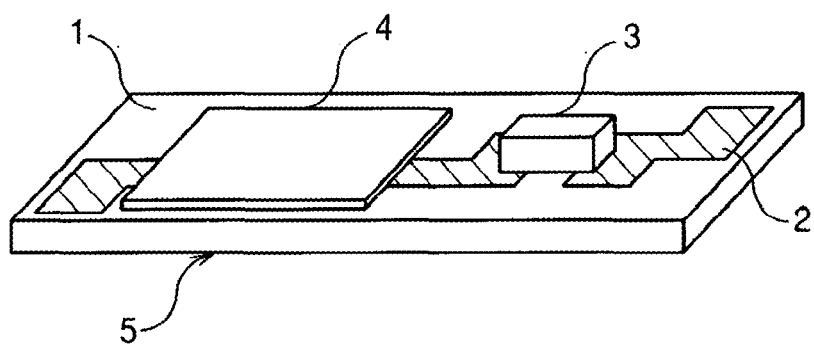
FIG. 3 shows, in a perspective and schematic view a bridge according to the present invention, which comprises a dielectric substrate, a connection circuit, an integrated circuit chip, and an insulating film, for the manufacture of a contactless object according to the present invention.

Referring now to FIG. 3, it may be seen that the bridge 5 furthermore comprises a chip having an integrated circuit. In practice, in the case of the contactless objects according to the present invention, the sizes of the chips are very small. They are of the order of 300 to 900 µm in length and width for a thickness of less than 200 µm.

In a first embodiment, the chip 3 has contact pads on which protrusions have been formed for ohmic connection with the pads 2-2 of the connections circuit.

In a second embodiment, the chip 3 is provided with connection plates for a capacitive coupling connection to the pads 2-2 of the connection circuit, through a passivation layer of said chip.

The chip 3 is positioned in an offset position towards one end of substrate 1. It is not centered on the latter.

Furthermore, the bridge 5 comprises an insulating film 4. This film at least partially covers the connection circuit 2. In practice, it covers a portion of a first circuit element of the connection circuit 2. It is made of a thin dielectric plastic sheet, or any other material such as paper or a printed or deposited insulating film, having such dielectric properties. The size, in particular the width and length, of this film is smaller than that of the bridge substrate 1. The thickness of this film is for example in the range between 5 and 20 µm.

In practice, the chips 3 are placed onto the bridge substrate 1, which is provided with a connection circuit 2, by means of pick-and-place machines provided with manipulator arms. More specifically, a tape, used to form the bridge substrates 1, runs close to the pick-and-place machine. The chips are picked up and then placed onto said tape, which may possibly have been pre-cut with the bridge format. Once the chips 3 have been positioned and the insulating films 4 have been deposited, the bridges 5, which have been cut, are finally placed onto the antenna substrate provided with the antenna circuit.

Figure 4:
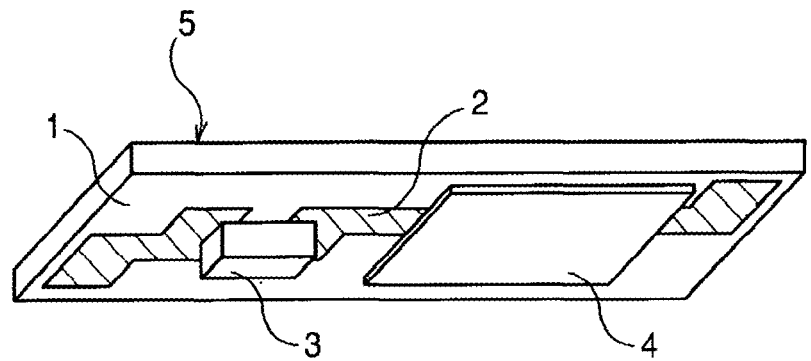
FIG. 4 shows, in a perspective and schematic view, a bridge for the manufacture of a contactless object according to the present invention, in a so-called flipped over position.
Figure 5:
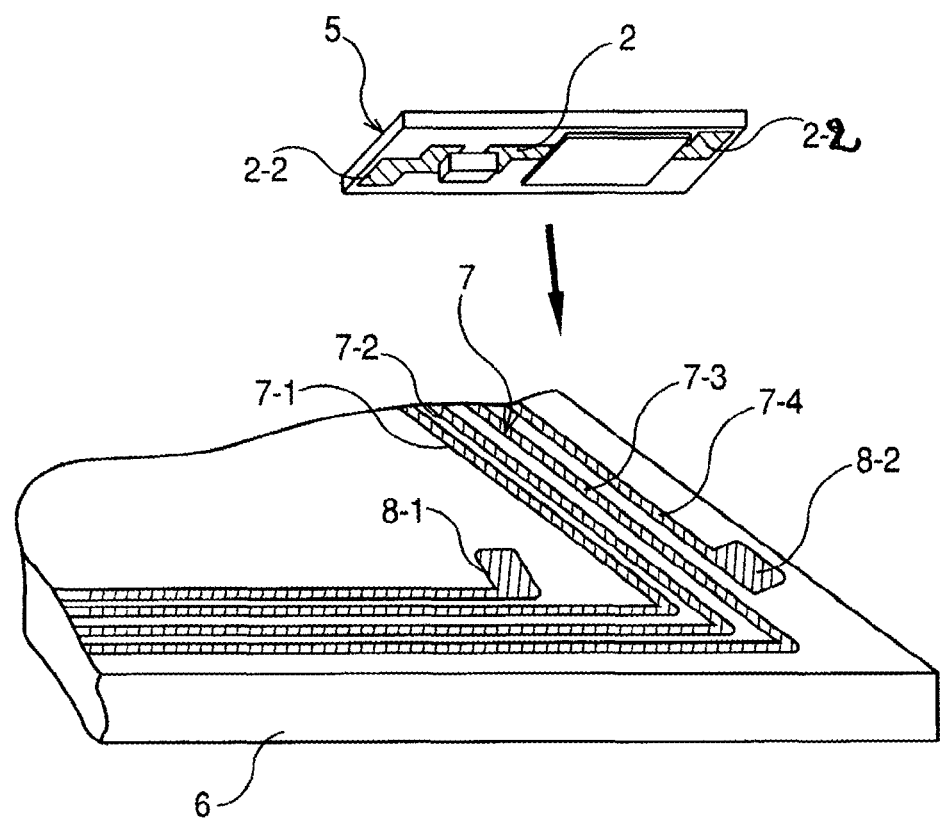
FIG. 5 shows, in a perspective and schematic view, a so-called pick-and-place step for placing the bridge onto the antenna substrate for the manufacture of a contactless object according to the present invention.

For the purpose of placing the bridges 5, as is shown in FIGS. 4 and 5 in a particular embodiment of the present invention, each bridge 5, provided with the connection circuit 2, the chip 3 and the insulating film 4, is flipped over by means of a manipulator arm.

A dielectric antenna substrate 6 is then provided. The format (length×width) of said antenna substrate 6 is arbitrary, although it is much larger than the format of the bridge 5. In an example, the thickness of the antenna substrate 6 is in the range between 25 and 80 µm. The substrate 6 is formed of plastics or any other appropriate material having dielectric properties, such as paper or cardboard, for example, in the case of an electronic passport. This antenna substrate 6 will previously have been provided with an antenna conducting circuit or antenna circuit 7. This antenna circuit 7, for example, is formed by printing onto the surface of the substrate 6, according to methods of the same type as those used for manufacturing the connection circuit 2 of bridge 5. The antenna circuit 7 forms, in one embodiment, a coil or spiral having at least one turn, and in practice, a plurality of turns. For example, in the case of FIG. 5, the antenna circuit has 4 turns, 7-1, 7-2, 7-3 and 7-4. The terminal portions of the antenna circuit 7 form contact terminals, for the electrical connection to the connection circuit 2 of the bridge. One of the terminals—which is denoted 8-1 in FIG. 5—is interior to the antenna circuit 7. The other terminal—this time denoted by 8-2—is a terminal which is exterior to the antenna circuit. The terminals 8-1 and 8-2 are located so as to face each other on substrate 6, on each side of the turns. The distance between terminals 8-1 and 8-2 is therefore greater than the width of the antenna circuit 7, which, here, is considered to be formed by all of the turns 7-1, 7-2, 7-3 and 7-4. This distance is of the same order of magnitude as the distance between terminals 2-1 and 2-2 of the connection circuit 2 of bridge 5. Furthermore, the terminal 8-1 is offset towards the inside of the antenna such that the distance between the inner turn 7-1 of antenna 7 and terminal 8-1 is greater than the length and/or width of the chip. Thus, during bridge placement, the chip will be positioned directly facing the dielectric substrate 6 and not the antenna turns.

According to the present invention, the bridge 5 is placed onto the dielectric antenna substrate 6 in such a way that said bridge 5 straddles the turns of the antenna circuit 7 and forms an electrical connection between the chip 3 and said antenna circuit 7. More specifically, the bridge 5 is placed onto the substrate 6 in such a way that it forms an electrical connection between terminals 8-1 and 8-2 and the pads 2-2 of the connection circuit 2. The chip is positioned directly in contact with the dielectric substrate 6, between the inner turn 7-1 and the inner contact terminal 8-1, that is, in an offset position with respect to the turns. The insulating film 4 covers the turns 7-1, 7-2 and 7-3 between terminals 8-1 and 8-2.

It should be noted that an anisotropic glue, which is conductive only in the vertical direction (a glue which is conductive in the Z direction) may be applied to the substrate 6 before the bridge 5 is deposited, to allow attachment of this bridge 5 to the substrate 6.

Figure 6:
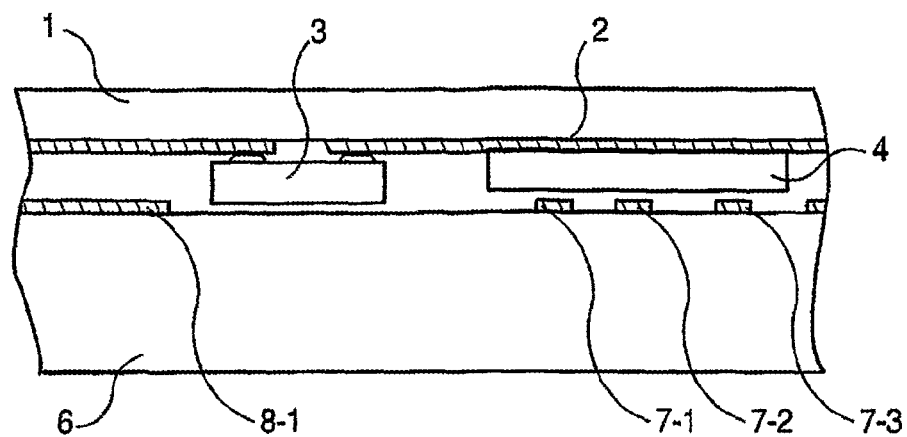
FIG. 6 shows, in a schematic cross-sectional view, a contactless object according to the present invention.

This will ultimately result in a contactless portable object 9 such as is shown in a cross-sectional view in FIG. 6.

This object 9 comprises an antenna substrate 6 provided with an antenna circuit 7, and a bridge 5 positioned so as to straddle the antenna circuit 7 and consequently, at least one turn of said circuit, wherein this bridge 5 comprises a chip 3, a connection circuit 2 and an insulating film 4, which prevents short-circuits between the bridge and the turns. In the contactless object, the chip 3 is positioned between the substrate 1 of bridge 5 and the antenna substrate 6. In other words, it is sandwiched between these two dielectric substrates 1 and 6. It is not positioned so as to be vertically facing the antenna turns 7. Thus, the thickness of the object is minimized and the risk of short-circuits caused by the presence of the chip are, in turn, minimized. Finally, the protection of chip 3 and of its connections within the object is improved. The anisotropic glue defines the connection between terminals 8-1 and 8-2 of the antenna circuit 7 and the pads 2-2 of the connection circuit of bridge 5. The chip 3 is thus connected to the antenna circuit 7.

Since the size of the bridge 5 is small with respect to the size of the object, the displacements of the manipulator arms of the machines used to pick up and place integrated circuits will be reduced. For example, if the bridge 5 has a size of the order of 10 mm in width and of the order of 20 mm in length, the resulting displacement of the integrated circuit manipulator arms will be only 1 to 2 centimeters, between two integrated circuit placement stations. Thus, on a substrate with a size of 1 square meter, the placement density of integrated circuits increases from 220 to 5,000.

In the embodiment illustrated in FIG. 7, the bridge is not provided with an insulator 4 such as is shown in FIG. 3. Neither is the bridge flipped over before being positioned onto the substrate provided with the antenna. Indeed, in this embodiment, the bridge is directly placed onto the so-called rear side of the substrate 6 which carries the antenna 7, that is, onto that side of the substrate 6 which is opposite to that which carries the antenna.

Advantageously, three holes are formed within the substrate 6. Two holes 9-1 and 9-2 are through-holes and hole 10 may either be a through-hole or a blind hole. Hole 9-1 is located vertically above the antenna terminal 8-1. Hole 9-2 is located vertically above antenna terminal 8-2. Hole 10 accommodates the chip 3. Thus, it may be considered, according to the present invention, that the chip is positioned so as to directly face the substrate 6, with an offset with respect to the turns 7-1, 7-2, 7-3 of the antenna. Hole 10 is located between the inner turn 7-1 and the terminal 8-1, which is inwardly offset.

Thus, the chip is protected from mechanical stresses not only by the substrate 1, but also by the substrate 6 into which it is incorporated. It is furthermore protected from short-circuits, since the chip is located at an offset position with respect to the antenna turns.

The method is easily implemented. There is no need for a step involving the addition of an insulator to the bridge. However, a step for forming the holes 9-1, 9-2 and 10 is carried out. This step may be combined with the step for forming (cutting) the bridge substrate 1. When the substrate 1, provided with holes, is thus obtained, the connection circuit 2 is formed. Advantageously, the conducting material used for forming the connection circuit 2 is poured into the holes 9-1 and 9-2.

The thus obtained object is thin. The thickness of the object is substantially equal to the total thickness of substrates 1 and 6.

In the embodiment of FIG. 8, through-holes 11-1, 11-2 are also formed within the antenna substrate 6. These holes 11-1 and 11-2 are located near to, and beside the antenna terminals 8-1 and 8-2. The bridge has terminal portions, which carry the pads 2-2 that are folded back into the holes 11-1, 11-2, onto terminals 8-1 and 8-2, in order to form the electrical connection of circuit 2 to the antenna.

In this embodiment, the chip is protected, in particular against mechanical stresses, since it is positioned between substrates 1 and 6. It is protected against short-circuits, in particular by the thickness of the electrical substrate 6 which carries the antenna circuit.

Furthermore, in the case where the terminal 8-1 is inwardly offset, the chip is positioned vertically below a portion of substrate 6 which carries no antenna circuit. This portion may be deformed, as is shown in FIG. 9, when manufacturing the object according to the present invention. The thinness of the objects is thus preserved.

It should be noted that the invention does not add any complex process step, thus allowing for constant-cost production.

It should be noted that the invention makes it possible to place bridges 5 according to positioning constraints, which are substantially smaller than those related to the placement of an integrated circuit. Indeed, the aim here is to place opposite each other connection pads/terminals which have large dimensions in comparison with the dimensions of the connection pads of integrated circuits.

It should be noted that the invention allows for a substantial increase in the throughput of integrated circuits placement, which is an aspect limiting the mounting throughputs of inlays and tags.

It should be noted that, according to the present invention, it is possible to form standard bridges which may be adapted to a range of different antenna shapes formed with several spirals, thus resulting, according to the present invention, in a substantial increase in the quantity of bridges produced with integrated circuits, which are thereby becoming an intermediate product in the manufacture of inlays and tags.

The invention claimed is:

1. A method for manufacturing contactless portable objects having an integrated circuit, which comprises the following steps:
providing a dielectric antenna substrate which carries an antenna circuit and has at least one turn and two contact terminals, wherein a first contact terminal is interior to the antenna circuit, and a second contact terminal is exterior to said antenna circuit;
providing a bridge which comprises a dielectric bridge substrate, a chip having an integrated circuit and a circuit for connecting said chip to the antenna circuit; and
placing said bridge provided with said chip onto said dielectric antenna substrate, so that
the bridge forms an electrical connection between said chip and said antenna circuit, and
the chip is positioned, while being protected between the bridge substrate and the antenna substrate or being incorporated within said antenna substrate, at a position offset with respect to the turn or turns of the antenna.

2. The method according to claim 1, wherein the contact terminal is offset towards the center of the substrate (and in that the chip is positioned so as to directly face the substrate between the inner turn of the antenna and said terminal.

3. The method according to claim 1, wherein the bridge is positioned onto the rear side of the substrate which carries the antenna circuit.

4. The method according to claim 3, wherein the substrate has three holes, in that two of said holes form a connection with the antenna terminals and in that the last hole accommodates the chip.

5. The method according to claim 3, wherein the substrate has two holes into which ends of the bridge are folded back for electrical connection to the antenna terminals through said holes.

6. The method according to claim 1, wherein the bridge further comprises a connection circuit and in that the electrical connection between said chip and said antenna circuit is formed by said connection circuit.

7. The method according to claim 1, wherein the bridge further comprises an insulating film, wherein said insulating film at least partially covers the connection circuit.

8. The method according to claim 1, wherein the bridge is placed onto the antenna substrate so that the chip of said bridge is located between the dielectric bridge substrate and said antenna substrate.

9. The method according to claim 1, wherein the chip is placed onto the substrate of the bridge by means of manipulator arms of pick-and-place machines whose displacements are restricted by the size of said substrate.

10. The method according to claim 1, wherein the dielectric bridge substrate carries the chip and the connection circuit, wherein, after the bridge is placed on said dielectric antenna substrate, the connection circuit forms the electrical connection between said chip and said antenna circuit.

11. The method according to claim 10, wherein the dielectric bridge substrate extends at least from the chip to a connection point between the connection circuit and the antenna circuit.

12. A contactless portable object having an integrated circuit, which comprises:
a dielectric antenna substrate provided with an antenna circuit having at least one turn and two contact terminals; and
a bridge placed onto said dielectric antenna substrate, wherein said bridge comprises a dielectric bridge substrate and a chip having an integrated circuit, said bridge forms an electrical connection between said chip and said antenna circuit, and said chip is positioned, while being protected between the bridge substrate and the antenna substrate or being incorporated into said antenna substrate, in an offset position with respect to the turn or turns of the antenna.

13. The object according to claim 12, wherein the contact terminal is offset towards the center of the substrate and the chip is positioned so as to directly face the substrate between the inner turn of the antenna and said terminal.

14. The object according to claim 12, wherein the bridge is positioned onto the backside of the substrate which carries the antenna circuit.

15. The object according to claim 12, whereint the substrate has three holes, two of said holes form a connection with the antenna terminals and the last hole accommodates the chip.

16. The object according to claim 12, wherein the substrate has two holes, into which ends of the bridge are folded back for electrical connection to the antenna terminals through said holes.

17. The object according to claim 12, wherein the bridge includes a connection circuit provided with connection terminals and pads for connection to the chip.

18. The object according to claim 12, wherein the bridge includes an insulating film.

19. The object according to claim 12, wherein the chip is incorporated into the object, between the bridge substrate and the antenna substrate.

20. The object according to claim 12, wherein said object is an HF RFID object.

21. The object according to claim 12, wherein the dielectric bridge substrate carries the chip and a connection circuit forming the electrical connection between said chip and said antenna circuit.

22. The object according to claim 21, wherein the dielectric bridge substrate extends at least from the chip to a connection point between the connection circuit and the antenna circuit.

* * * * *